United States Patent
Sato

(10) Patent No.: US 10,270,924 B2
(45) Date of Patent: Apr. 23, 2019

(54) INFORMATION PROCESSING APPARATUS, METHOD FOR CONTROLLING INFORMATION PROCESSING APPARATUS, AND RECORDING MEDIUM

(71) Applicant: CANON KABUSHIKI KAISHA, Tokyo (JP)

(72) Inventor: Tomoya Sato, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/449,758

(22) Filed: Mar. 3, 2017

(65) Prior Publication Data
US 2017/0264760 A1 Sep. 14, 2017

(30) Foreign Application Priority Data

Mar. 8, 2016 (JP) .................. 2016-044983

(51) Int. Cl.
*G06F 3/12* (2006.01)
*H04N 1/00* (2006.01)
*H04N 1/32* (2006.01)

(52) U.S. Cl.
CPC ....... *H04N 1/00344* (2013.01); *G06F 3/1203* (2013.01); *G06F 3/1229* (2013.01); *G06F 3/1285* (2013.01); *H04N 1/00061* (2013.01); *H04N 1/00392* (2013.01); *H04N 1/00408* (2013.01); *H04N 1/00411* (2013.01); *H04N 1/00973* (2013.01); *H04N 1/32662* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 2005/0054342 A1* | 3/2005 | Otsuka .................. | H04L 63/083 455/426.2 |
| 2006/0290680 A1* | 12/2006 | Tanaka ............... | H04N 1/00204 345/173 |
| 2009/0296127 A1* | 12/2009 | Kasamatsu ........ | H04N 1/00307 358/1.13 |
| 2010/0069008 A1* | 3/2010 | Oshima .................. | H04W 4/02 455/41.3 |
| 2011/0170138 A1* | 7/2011 | Takahashi .......... | G03G 15/5075 358/1.15 |
| 2015/0070398 A1* | 3/2015 | Tomono ............. | H04N 1/00413 345/666 |
| 2015/0181056 A1 | 6/2015 | Mutsuno | |
| 2015/0293731 A1* | 10/2015 | Yamada ............... | H04N 1/0035 358/1.15 |
| 2016/0170638 A1* | 6/2016 | Funakawa ............. | G06F 3/0488 715/773 |

FOREIGN PATENT DOCUMENTS

JP    2015-032224 A    2/2015

* cited by examiner

*Primary Examiner* — Moustapha Diaby
(74) *Attorney, Agent, or Firm* — Canon U.S.A., Inc. I.P. Division

(57) ABSTRACT

A setting is made such that an operation screen based on screen information transmitted to an external apparatus is not displayed on a display during a connection with the external apparatus for remote control.

10 Claims, 11 Drawing Sheets

FIG. 10

| EVENT | NOTIFICATION ALLOWED |
|---|---|
| TOUCH PANEL | NO |
| START KEY | NO |
| STOP KEY | NO |
| SCREEN-BRIGHTNESS ADJUSTING KEY | YES |

INFORMATION PROCESSING APPARATUS, METHOD FOR CONTROLLING INFORMATION PROCESSING APPARATUS, AND RECORDING MEDIUM

BACKGROUND OF THE INVENTION

Field of the Invention

The present invention relates to an information processing apparatus that enables remote control from an external apparatus, a method for controlling the information processing apparatus, and a recording medium.

Description of the Related Art

A remote-maintenance service achieved by communicating sound or video or by performing remote control has been proposed for an image forming apparatus. In the remote-maintenance service, when an error occurs in the image forming apparatus, a person (hereinafter referred to as a technician) for maintenance does not go to the location of the image forming apparatus, and a user is informed of a method for correcting the error directly from a call center. Accordingly, it is possible to shorten the time taken to correct the error.

In addition, Japanese Patent Laid-Open No. 2015-032224 discloses a method for enabling operation of an operation screen of the image forming apparatus from a terminal at the call center by using a virtual network computing (VNC) protocol. Specifically, the image forming apparatus having a VNC server function transmits screen information for an operation panel to the terminal at the call center having a VNC client function. On the basis of the received screen information, the terminal at the call center displays a screen that is substantially the same as the operation screen displayed on the operation panel of the image forming apparatus. On the basis of an operation on the screen, the terminal at the call center transmits an operation command to the image forming apparatus. On the basis of the operation command received from the terminal at the call center, the image forming apparatus performs various control processes (e.g., switching operation screen and changing settings). Accordingly, it is possible to perform remote control on the image forming apparatus from the call center without a technician going to the location of the image forming apparatus.

However, the above-described related art has the following problems. For example, in the remote-maintenance service, depending on details of maintenance or a problem, settings that are not usually displayed on the user side, such as the initial setting of the image forming apparatus, may be made by performing an instruction or operation at the call center. In a case of a malfunction of the image forming apparatus, for example, a screen for maintenance of the apparatus including settings that are made only by the technician is displayed. This screen includes settings that are visible only to restricted users, such as technicians, who understand the details of maintenance so as not to intentionally make a setting that fails to ensure operation. If the remote-maintenance service is performed in accordance with the above-described related art, in order to operate the maintenance screen from the terminal at the cell center, the maintenance screen is also to be displayed on an operation unit of the image forming apparatus.

SUMMARY OF THE INVENTION

The present invention provides an information processing apparatus that transmits screen information of an operation screen to an external apparatus in order to enable remote control from the external apparatus and that does not display the operation screen while being connected with the external apparatus for remote control.

The present invention provides an information processing apparatus including a display, the information processing apparatus also including a remote-control target unit configured to transmit, to an external apparatus connected with the information processing apparatus via a network, screen information corresponding to an operation screen for operating the information processing apparatus and to receive, from the external apparatus on which a screen based on the screen information is displayed, an instruction based on an operation on the screen; and a setting unit configured to make provide a setting in such a manner that the operation screen corresponding to the screen information transmitted to the external apparatus is not displayed on the display while the information processing apparatus is connected with the external apparatus for remote control.

Further features of the present invention will become apparent from the following description of exemplary embodiments with reference to the attached drawings.

BRIEF DESCRIPTION OF THE DRAWINGS

FIG. 10 schematically illustrates a notification-allowed event table.

DESCRIPTION OF THE EMBODIMENTS

Now, embodiments of the present invention will be described in detail below with reference to the attached drawings. Note that the following embodiments are not limiting the present invention according to the scope of the claims. In addition, all of the combinations described below in the embodiments are not necessary to implement the present invention.

First Embodiment

Figure 1:
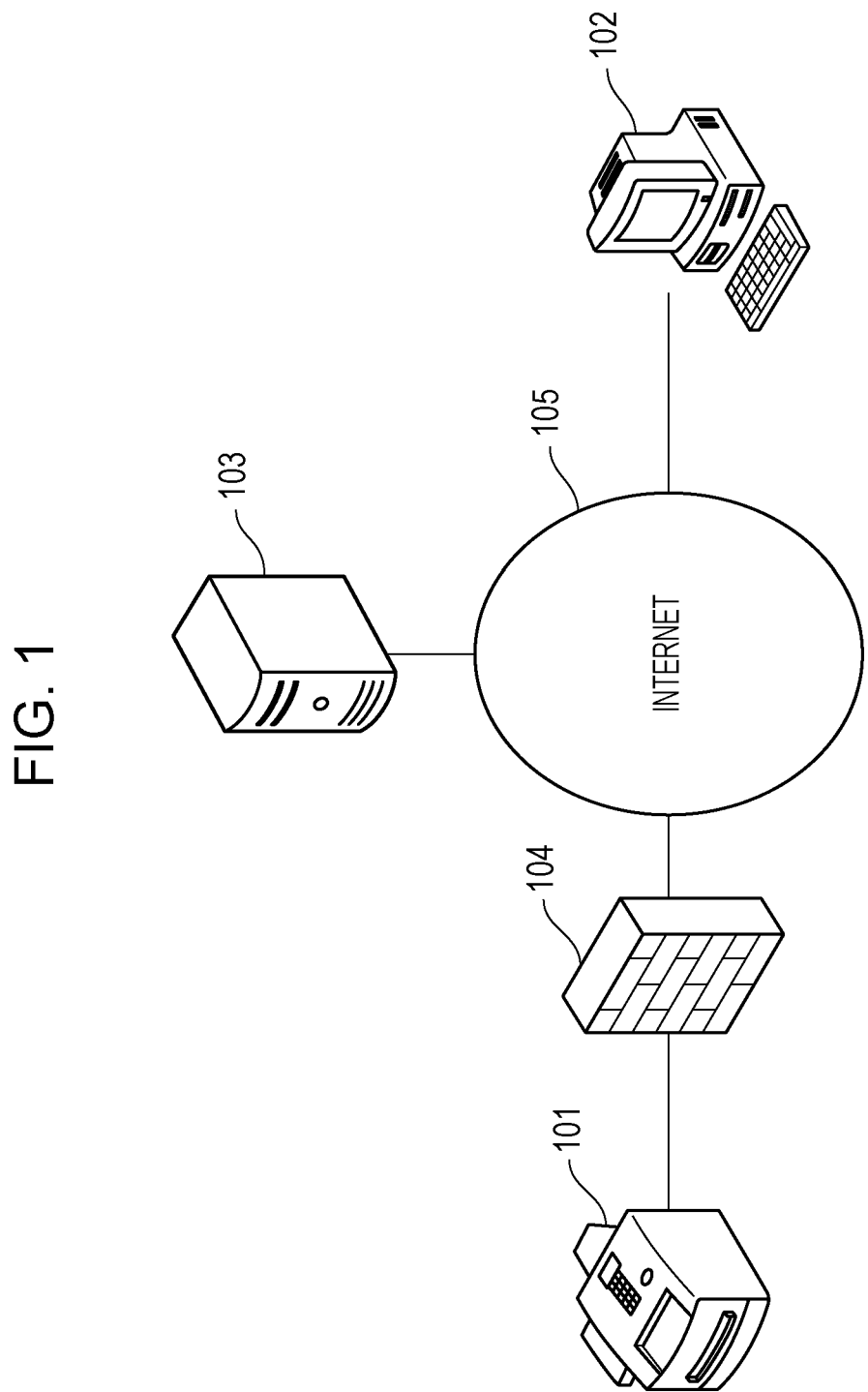
FIG. 1 illustrates a network configuration.

First, a configuration of a remote-maintenance system according to this embodiment will be described with reference to FIG. 1.

The remote-maintenance system according to this embodiment includes an image forming apparatus 101, a call-center terminal (external apparatus) 102, and a relay server 103. Each of the image forming apparatus 101 and the call-center terminal 102, as an apparatus to which the present invention is applied, has remote-maintenance functions such as communicating sound or video and performing remote control and operates as a communication partner during remote maintenance. The relay server 103 has a communication function as a Hypertext Transport Protocol (HTTP) server. The relay server 103 manages a session between the image forming apparatus 101 and the call-center terminal 102. Although an example of a single image forming apparatus is illustrated, the present invention is not limited to this example, and a plurality of image forming apparatuses may be provided.

Each of the image forming apparatus 101 and the call-center terminal 102 has a communication function as an HTTP client. The image forming apparatus 101 is connected by HTTP to the relay server 103 on an internet 105 through a firewall 104. The call-center terminal 102 is also connected by HTTP to the relay server 103. The image forming apparatus 101 communicates data with the call-center terminal 102 via the relay server 103.

The call-center terminal 102 according to this embodiment is a terminal operated by a maintenance operator at a call center so as to maintain the image forming apparatus 101. The call-center terminal 102 has a role of performing remote maintenance of the image forming apparatus 101 by communicating sound or video and performing remote control. The call-center terminal 102 has a function of a client for remote control of the image forming apparatus 101. Specifically, the call-center terminal 102 has virtual network computing (VNC) client software in accordance with a remote framebuffer (RFB) protocol. The call-center terminal 102 is capable of operating the image forming apparatus 101 by performing communication with a remote-control processing unit of the image forming apparatus 101. In this embodiment, the RFB protocol packets are packaged by the HTTP protocol.

Although the HTTP protocol is used for connection between the image forming apparatus 101 and the relay server 103 in this embodiment, another communication protocol having a high affinity with the firewall 104 may also be used. In addition, although the HTTP protocol is used for connection between the call-center terminal 102 and the relay server 103 in this embodiment, another communication protocol may also be used. Furthermore, although data communication between the image forming apparatus 101 and the call-center terminal 102 is performed via the relay server 103 in this embodiment, it is possible to additionally establish a communication path in which the image forming apparatus 101 is directly connected with the call-center terminal 102 and to perform data communication therebetween.

Figure 2:
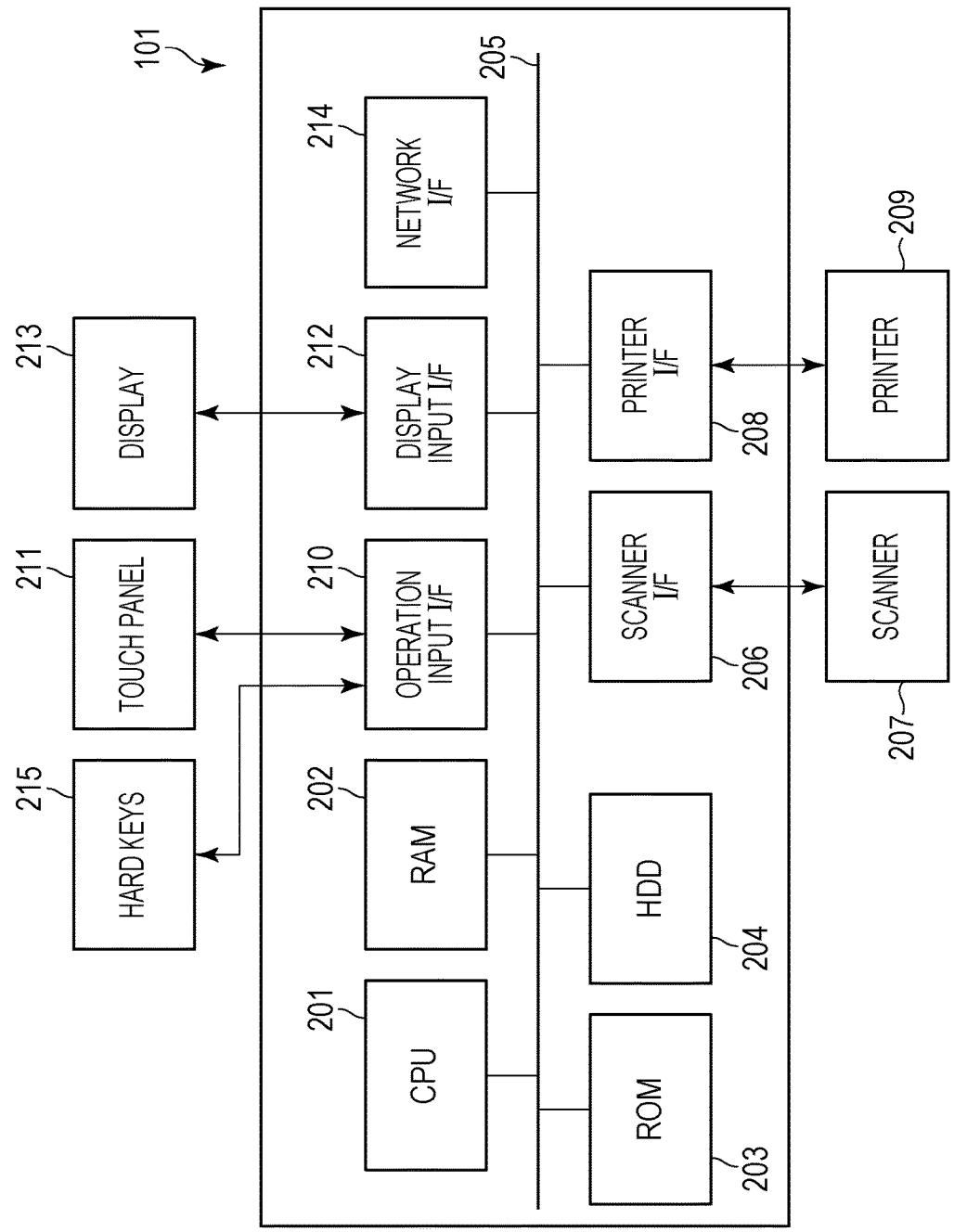
FIG. 2 illustrates a hardware configuration.

Next, a hardware configuration of the image forming apparatus 101 according to this embodiment will be described with reference to FIG. 2. The image forming apparatus 101 includes a central processing unit (CPU) 201, a random access memory (RAM) 202, a read only memory (ROM) 203, a hard disk drive (HDD) 204, a scanner interface (I/F) 206, a scanner 207, a printer I/F 208, and a printer 209. The image forming apparatus 101 further includes an operation input I/F 210, a touch panel 211, hard keys 215, a display control I/F 212, a display 213, and a network I/F 214.

The CPU 201 collectively controls accesses to various devices connected to a system bus 205 on the basis of control programs stored in the ROM 203 or on the HDD 204. The ROM 203 stores control programs and the like that are executable by the CPU 201. The RAM 202 is configured to mainly function as a main memory, work area, or the like of the CPU 201 and to be capable of increasing the memory capacity by using an option RAM connected to an additional port that is not illustrated. The HDD 204 stores a boot program, various applications, font data, user files, edited files, and the like. Although the HDD 204 is used in this embodiment, a secure digital (SD) card, a flash memory, or the like may be used as an external memory device in addition to the HDD 204.

The scanner I/F 206 controls image input from the scanner 207. The printer I/F 208 controls image output to the printer 209.

The operation input I/F 210 generates a control signal in accordance with a user operation and supplies the control signal to the CPU 201. The operation input I/F 210 is connected to the touch panel 211 and the hard keys 215 as input devices that receive the user operation. The touch panel 211 is an input device that outputs information on coordinates corresponding to a position at which a user has touched a planar-structured input unit. The hard keys 215 are input devices that are physically pushable, such as numerical keys, a start key, and a stop key. The CPU 201 controls each unit of the image forming apparatus 101 in accordance with a program on the basis of a control signal generated by and supplied from the operation input I/F 210 in accordance with a user operation performed on any of the input devices. Accordingly, the image forming apparatus 101 can operate in accordance with the user operation.

The display control I/F 212 outputs a display signal for displaying an image to the display 213. For example, the display control I/F 212 is supplied with a display control signal generated by the CPU 201 in accordance with a program. The display control I/F 212 generates a display signal on the basis of the display control signal and outputs the display signal to the display 213. For example, on the basis of the display control signal generated by the CPU 201, the display control I/F 212 causes a graphical user interface (GUI) screen including a GUI to be displayed on the display 213.

The touch panel 211 and the display 213 are integrally formed. For example, the touch panel 211 is formed in such a manner that light transmittance does not interrupt display on the display 213, and the touch panel 211 is attached to an upper layer of the display surface of the display 213. Then, coordinates of input on the touch panel 211 are associated with coordinates of the display on the display 213. Accordingly, a GUI can be formed such that the screen displayed on the display 213 can be operated directly by the user. Note that the set of the touch panel 211 and the display 213 is called an operation panel, and the set of the touch panel 211, the display 213, and the hard keys 215 is called an operation unit.

The network I/F 214 performs data communication with an external network through a network cable.

Figure 3:
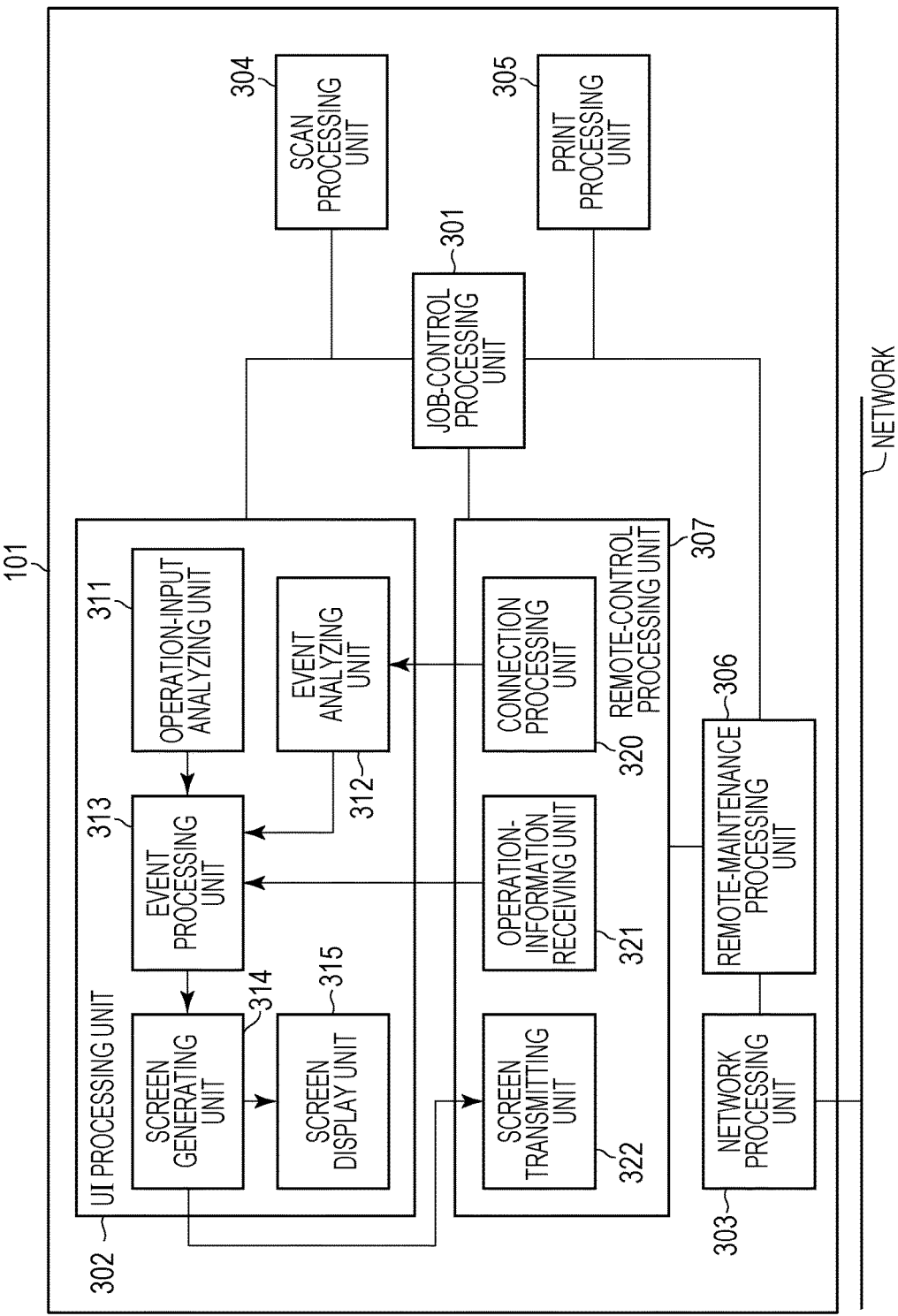
FIG. 3 illustrates a software configuration.

Next, a software configuration of the image forming apparatus 101 according to this embodiment will be described with reference to FIG. 3. Each software module illustrated here mainly operates on the CPU 201.

A job-control processing unit 301 collectively controls software modules that are illustrated and not illustrated and controls various jobs generated in the image forming apparatus 101, such as copying, printing, scanning, user interface (UI) processing.

A user interface (UI) processing unit 302 includes an operation-input analyzing unit 311, an event analyzing unit 312, an event processing unit 313, a screen generating unit 314, and a screen display unit 315. The operation-input analyzing unit 311 analyzes the control signal supplied from the operation input I/F 210 and notifies the event processing unit 313 of an event in accordance with a user operation. The event analyzing unit 312 receives and analyzes a phenomenon that occurs in the image forming apparatus 101 in addition to the operation input and notifies the event processing unit 313 of an event in accordance with the phenomenon. The event processing unit 313 receives an event from the operation-input analyzing unit 311, the event analyzing unit 312, and an operation-information receiving unit 321, which will be described later, and controls each unit of the image forming apparatus 101 in accordance with the event. If it is necessary to change a screen to be displayed on the display 213, the event processing unit 313 contacts the screen generating unit 314. The screen generating unit 314 generates, in the RAM 202, data (screen information) of the screen to be displayed on the display 213. The screen display unit 315 controls the display control I/F 212 to display the screen on the display 213 on the basis of the screen data generated by the screen generating unit 314.

A network processing unit 303 is a module that mainly controls communication with an external apparatus via the network I/F 214 and controls communication with each apparatus on a local area network (LAN). Upon receiving a control command or data from each apparatus on the LAN, the network processing unit 303 notifies the job-control processing unit 301 of details of the control command or data. In addition, on the basis of an instruction from the job-control processing unit 301, the network processing unit 303 transmits a control command or data to each apparatus on the LAN.

On the basis of an instruction from the job-control processing unit 301, a scan processing unit 304 controls the scanner 207 and the scanner I/F 206 to read an image on a document that is placed on the scanner 207 and to generate image data. On the basis of an instruction from the job-control processing unit 301, a print processing unit 305 controls the printer 209 and the printer I/F 208 to print the image based on the specified image data.

In accordance with a setting of call-center-connection information stored on the HDD 204, a remote-maintenance processing unit 306 obtains a uniform resource locator (URL) of the relay server 103 and establishes a connection with the relay server 103 via the network processing unit 303. On the established session, the remote-maintenance processing unit 306 communicates data such as sound, video, and data for remote control via the network processing unit 303. If the received data is data for remote control, the remote-maintenance processing unit 306 requests a remote-control processing unit 307 to perform processing by sending a notification.

The remote-control processing unit 307 includes the following modules: a connection processing unit 320, the operation-information receiving unit 321, and a screen transmitting unit 322. The remote-control processing unit 307 is a VNC server module that performs communication by the RFB protocol and is a software module that performs communication with a VNC client operating on the call-center terminal 102 via a network. The connection processing unit 320 receives a connection request from the VNC client and performs connection processing. The operation-information receiving unit 321 receives operation information from the VNC client and notifies the event processing unit 313 of an event in accordance with the operation information. Note that the event that is sent as a notification from the operation-information receiving unit 321 is the same or substantially the same as an event sent as a notification from the operation-input analyzing unit 311. The screen transmitting unit 322 reads the screen data generated by the screen generating unit 314 from the RAM 202 and transmits the screen data to the VNC client.

Figure 4:
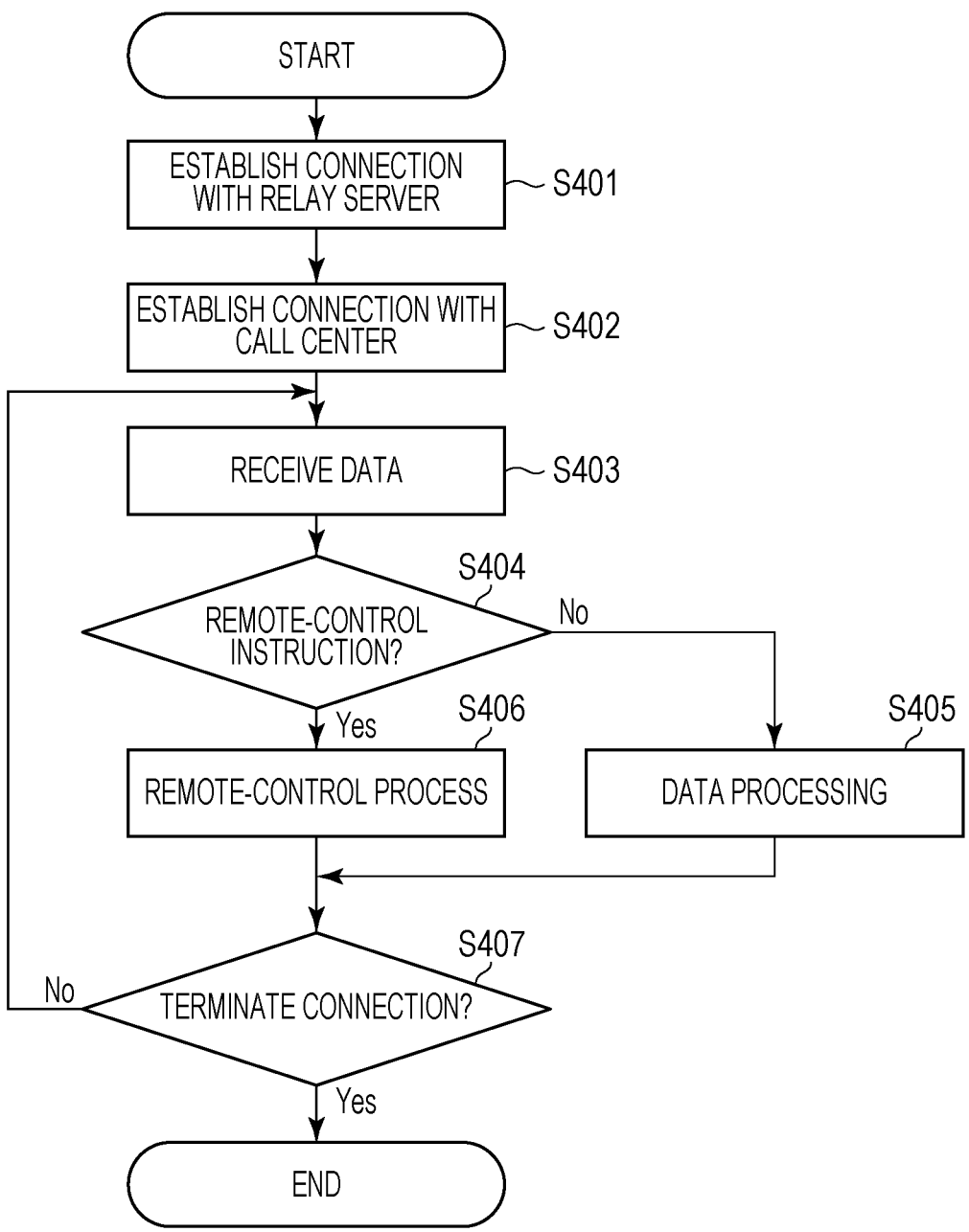
FIG. 4 is a flowchart illustrating a remote-control process.

FIG. 4 is a flowchart illustrating a communication process performed by the image forming apparatus 101 with the call-center terminal 102 via the relay server 103. The process described below is realized by a program stored on the HDD 204 being read to the RAM 202 and executed by the CPU 201.

In response to a user performing an operation for establishing a connection with a call center, in step S401, the remote-maintenance processing unit 306 receives an instruction for contacting the call center from the UI processing unit 302. The remote-maintenance processing unit 306 reads the URL of the relay server 103 from the HDD 204 and establishes an HTTP connection with the relay server 103. Then, in step S402, the remote-maintenance processing unit 306 establishes a session with the call-center terminal 102 via the relay server 103.

In step S403, the remote-maintenance processing unit 306 communicates sound, video, and remote control data with the call-center terminal 102 via the network processing unit 303 on the session established in step S402. Accordingly, a remote-maintenance process starts between the user of the image forming apparatus 101 and an operator of the call-center terminal 102. In step S404, the remote-maintenance processing unit 306 determines whether or not the data received in step S403 is an instruction for performing remote control. The instruction for remote control represents data used for performing remote control other than control related to sound or video. If the data is the instruction for performing remote control, the process proceeds to step S406; if not, the process proceeds to step S405. In step S405, the remote-maintenance processing unit 306 requests the UI processing unit 302 to perform data processing, for example, to reproduce the sound or to play back the video, and the process proceeds to step S407. In step S406, the remote-maintenance processing unit 306 requests the remote-control processing unit 307 to perform a remote-control process. Details of the remote-control process will be described later. In step S407, if the connection with the relay server 103 and the call-center terminal 102 has been terminated, the remote-maintenance processing unit 306 ends the process; if not, the remote-maintenance processing unit 306 receives data from the relay server 103 and the call-center terminal 102.

Figure 5:
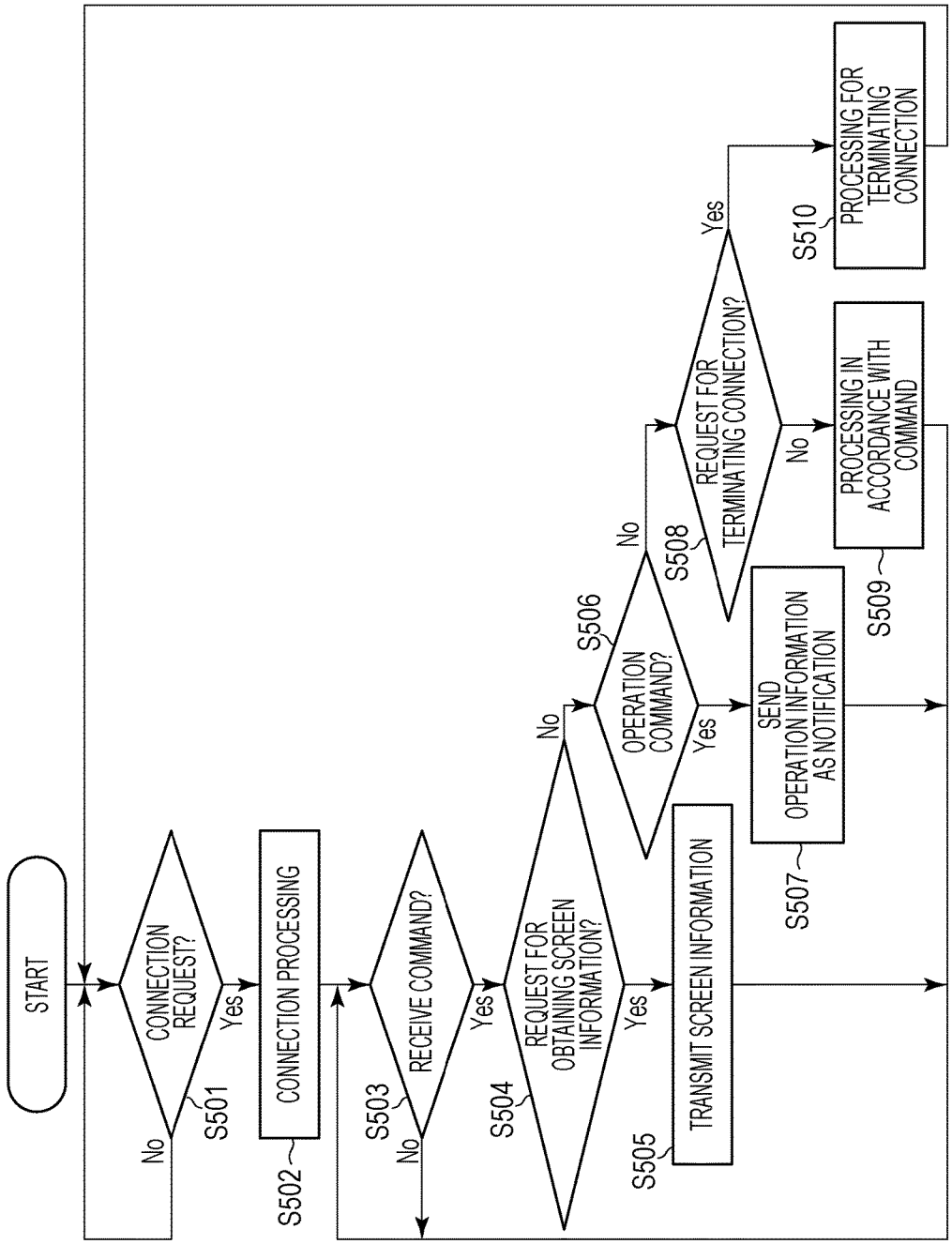
FIG. 5 is a flowchart illustrating details of the remote-control process in an image forming apparatus.

FIG. 5 is a flowchart illustrating details of the remote-control process (S406). The process described below is realized by a program stored on the HDD 204 being read to the RAM 202 and executed by the CPU 201.

In step S501, the remote-control processing unit 307 waits for a connection request for performing the remote-control process. Upon receiving the connection request, the process proceeds to step S502. In step S502, on the basis of the request, the remote-control processing unit 307 performs connection processing for performing remote control. Specifically, the remote-control processing unit 307 receives the connection request from the VNC client on the call-center terminal 102 via the remote-maintenance processing unit 306 and establishes a session by the RFB protocol. This connection processing is performed by the connection processing unit 320 in the remote-control processing unit 307.

In step S503, the remote-control processing unit 307 receives a command from the VNC client on the call-center terminal 102. In step S504, the remote-control processing unit 307 determines whether or not the received command is a request for obtaining screen information. If it is determined that the received command is a request for obtaining screen information, the process proceeds to step S505; if it is determined that the received command is not a request for obtaining screen information, the process proceeds to step S506. In step S505, the remote-control processing unit 307 reads the screen information and transmits the screen information to the VNC client that is being connected. The screen information transmitted in this step is generated by the screen generating unit 314 in the RAM 202. This processing is performed by the screen transmitting unit 322 in the remote-control processing unit 307. Once the screen information is transmitted, the process returns to step S503 and waits for the next command.

In step S506, the remote-control processing unit 307 determines whether or not the received command is an operation command. The operation command is transmitted to the remote-control processing unit 307 via the remote-maintenance processing unit 306 in response to an operation on the screen displayed on the VNC client on the call-center terminal 102. If it is determined that the received command is an operation command, the process proceeds to step S507; if it is determined that the received command is not an operation command, the process proceeds to step S508. In step S507, the remote-control processing unit 307 sends a notification about operation information. Specifically, the operation-information receiving unit 321 notifies the event processing unit 313 in the UI processing unit 302 of an operation event corresponding to the received operation command. The operation event sent as a notification is the same or substantially the same as an operation event on the touch panel or hard keys sent as a notification by the operation-input analyzing unit 311.

Once the event is sent as a notification, the process returns to step S503 and waits for the next command. In step S508, the remote-control processing unit 307 determines whether or not the received command is a request for terminating the connection. If it is determined that the received command is not a request for terminating the connection, the process proceeds to step S509; if it is determined that the received command is a request for terminating the connection, the process proceeds to step S510. In step S509, the remote-control processing unit 307 performs processing corresponding to the command, and the process returns to step S503 and waits for the next command to be received. In step S510, the remote-control processing unit 307 performs processing for terminating the connection, and the process returns to step S501. Specifically, the connection processing unit 320 invalidates the session by the RFB protocol, thereby terminating the connection with the VNC client. At this time, the terminating of the connection with the VNC client is sent as a notification to the event analyzing unit 312. Note that the same or substantially the same processing as the processing for terminating the connection in step S510 is performed when communication with the VNC client is invalidated due to a change in a network environment or the like, for example.

Through the above-described remote-control process, an operation screen for operating the image forming apparatus 101 is displayed on the call-center terminal 102. In addition, by operating the operation screen displayed on the call-center terminal 102, the remote control of the image forming apparatus 101 can be performed.

Figure 6:
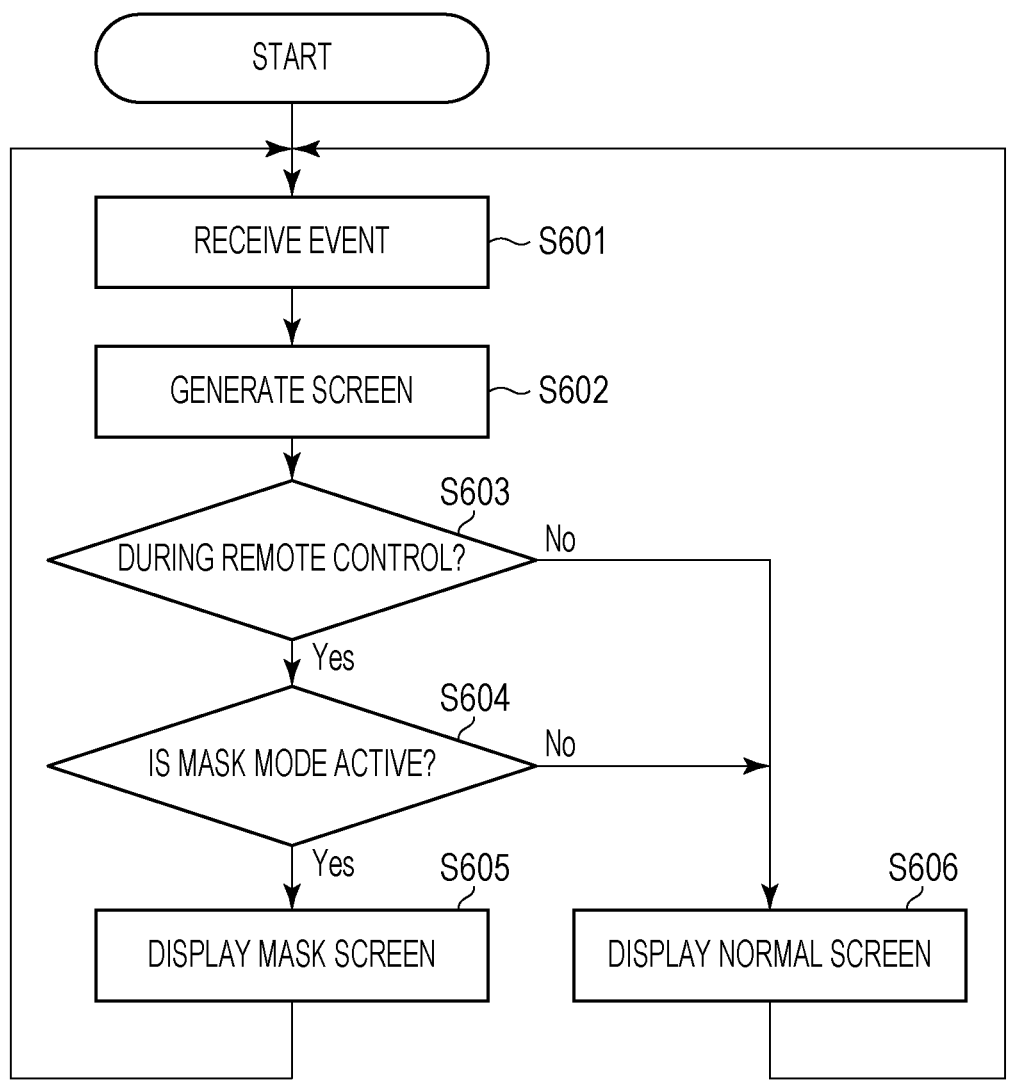
FIG. 6 is a flowchart illustrating details of a process performed by a user interface (UI) processing unit.

Next, details of a process performed by the UI processing unit 302 will be described with reference to the flowchart in FIG. 6. The process described below is realized by a program stored on the HDD 204 being read to the RAM 202 and executed by the CPU 201.

In step S601, the event processing unit 313 receives an event from the operation-input analyzing unit 311, the event analyzing unit 312, or the operation-information receiving unit 321. Then, the event processing unit 313 performs processing in accordance with the event, and the process proceeds to step S602. Specifically, the event processing unit 313 controls each unit of the image forming apparatus 101 via the job-control processing unit 301. In step S602, the UI processing unit 302 generates a screen. Specifically, the screen generating unit 314 generates, in the RAM 202, data of a screen to be displayed on the display 213.

Figure 7:
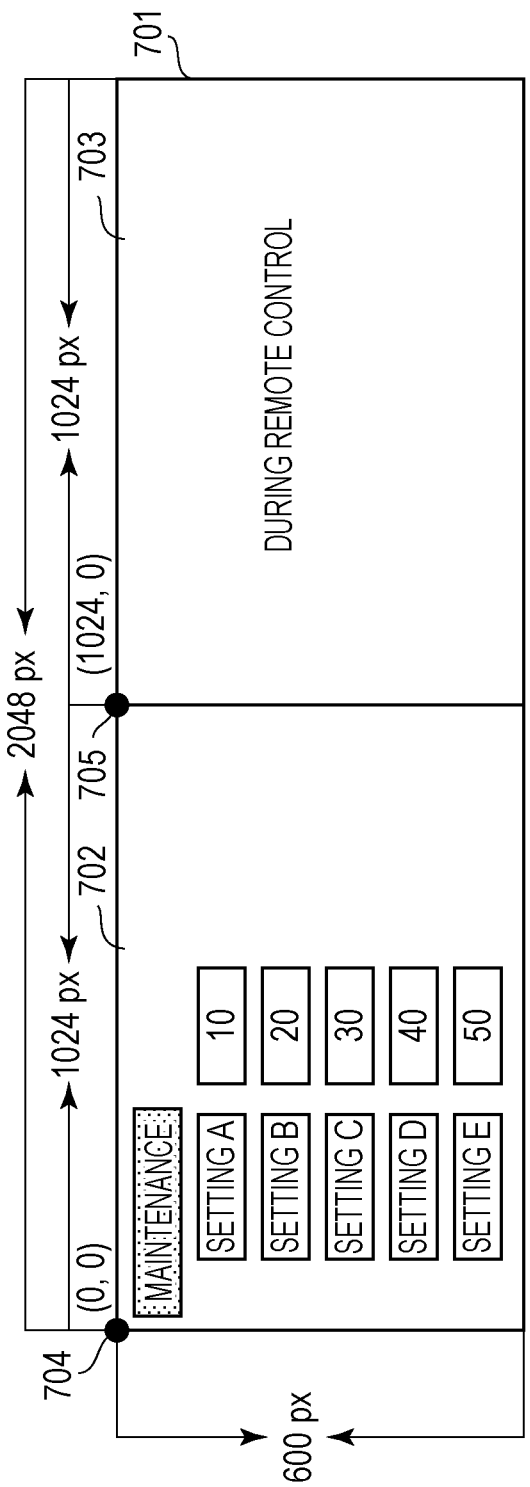
FIG. 7 illustrates an example of screen data generated by a screen generating unit in a random access memory (RAM).

FIG. 7 illustrates an example of screen data generated by the screen generating unit 314 in the RAM 202. The screen generating unit 314 sets a specific region in the RAM 202 as a virtual display region 701 and generates the screen data in the virtual display region 701.

The virtual display region 701 includes a normal display region 702 and an enlarged display region 703, which have the same display size (e.g., 1024 pixels in width and 600 pixels in height). The display size is determined in accordance with the display size (e.g., 1024 pixels in width and 600 pixels in height) of the display 213. An image depicted in the normal display region 702 or an image depicted in the enlarged display region 703 is displayed on the display 213.

In the normal display region 702, the screen generating unit 314 depicts an image by setting a starting point 704 at an x-coordinate of "0" and a y-coordinate of "0". The image depicted in the normal display region 702 is of a normal operation screen, and information thereof is transmitted to the VNC client in step S505 in FIG. 5 during remote control. In the enlarged display region 703, the screen generating unit 314 depicts an image by setting a starting point 705 at an x-coordinate of "1024" and a y-coordinate of "0". The image depicted in the enlarged display region 703 is of a screen for informing the user that it is not possible to operate the image forming apparatus 101 through the operation unit because remote control is currently being performed.

Referring back to FIG. 6, in step S603, the screen display unit 315 determines whether or not remote control is currently being performed. Although the determination may be performed in a plurality of manners, in this embodiment, whether or not remote control is currently being performed is determined by the screen display unit 315 referring to remote-control connection information stored in the RAM 202. The remote-control connection information is stored in the RAM 202 when it is detected that the connection processing unit 320 in the remote-control processing unit 307 has established a connection in response to a connection request from the client and when it is detected that the connection with the client has been terminated. Note that the determination in step S603 may be performed by the screen display unit 315 directly inquiring of the connection processing unit 320 whether remote control is currently being performed. If it is determined that the remote control is currently being performed, the process proceeds to step S604; if it is determined that the remote control is not currently being performed, the process proceeds to step S606.

In step S604, the screen display unit 315 determines whether or not a mask mode is active. Specifically, the screen display unit 315 determines whether a mask mode is active or inactive by referring to mask-mode setting information stored on the HDD 204. The setting for setting the mask mode to be active or inactive can be provided by the user of the image forming apparatus 101 or the operator at the call center opening a mask-mode setting screen as necessary.

Figure 8:
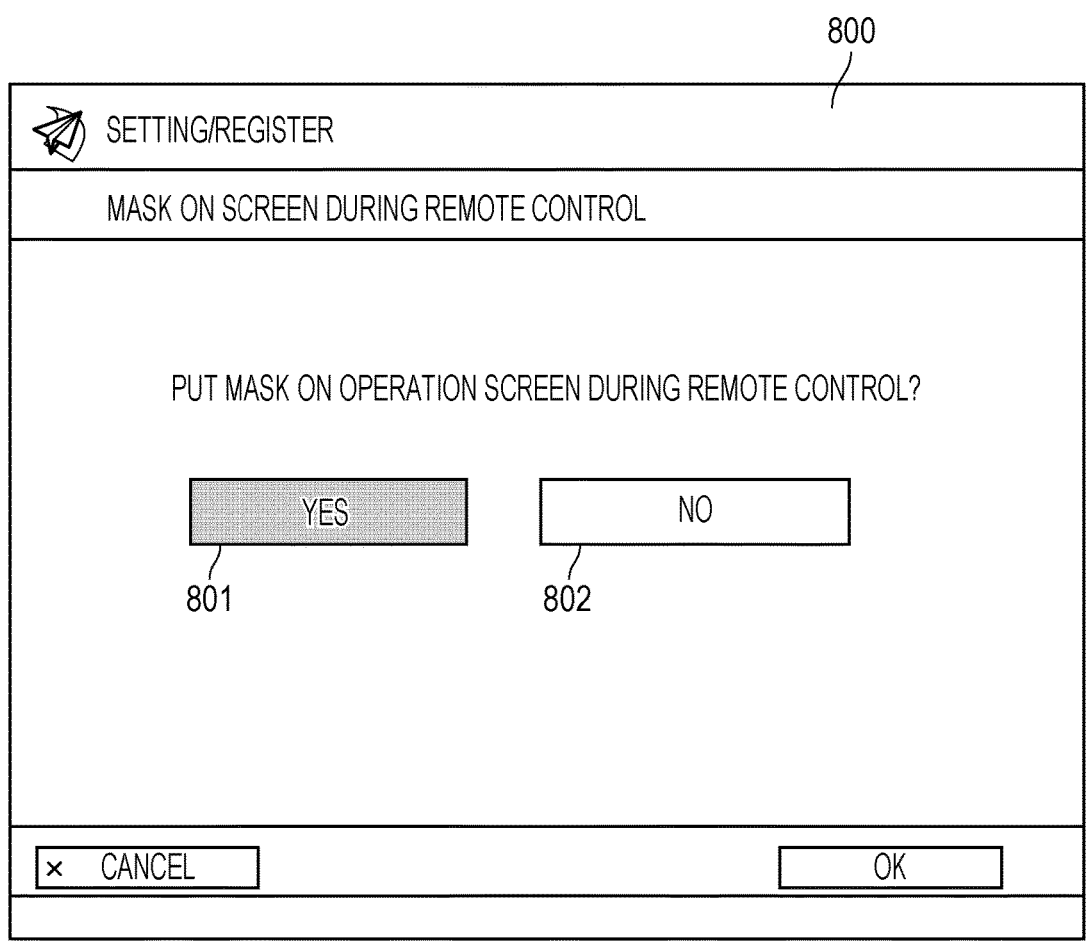
FIG. 8 illustrates an example of a mask-mode setting screen.

FIG. 8 illustrates an example of a mask-mode setting screen 800 displayed on the display 213 of the image forming apparatus 101 or the call-center terminal 102. A button 801 is a button selected when an operation screen is to be masked during remote control, and a button 802 is a button selected when an operation screen is not to be masked during remote control. The button 801 and the button 802 are configured such that if one is selected, the other is not selectable, and vice versa. Upon selecting either button, the selected information is stored on the HDD 204 as the mask-mode setting information. Note that the mask mode may be set in a manner different from the setting through the specific setting screen illustrated in FIG. 8. For example, the setting of the mask mode may be switched upon pushing a specific combination of the hard keys 215 of the image forming apparatus 101 or keys of the call-center terminal 102. Note that the mask mode is set to be inactive by default. In addition, upon terminating the connection with the VNC client, the mask mode is automatically set to be inactive.

Referring back to FIG. 6, in step S604, if it is determined that the mask mode is active, the process proceeds to step S605; if it is determined that the mask mode is inactive, the process proceeds to step S606.

In step S605, the screen display unit 315 displays a mask screen. Specifically, the screen display unit 315 transfers data of the enlarged display region 703 in the virtual display region 701 to the display 213. On the other hand, in step S606, the screen display unit 315 displays a normal screen. Specifically, the screen display unit 315 transfers data of the normal display region 702 in the virtual display region 701 to the display 213. As described above, the data that the screen transmitting unit 322 reads and transmits to the VNC client in step S505 is always data of the normal display region 702. That is, if the mask mode is active, the screen displayed on the display 213 is different from the screen displayed on the call-center terminal 102.

Figure 9:
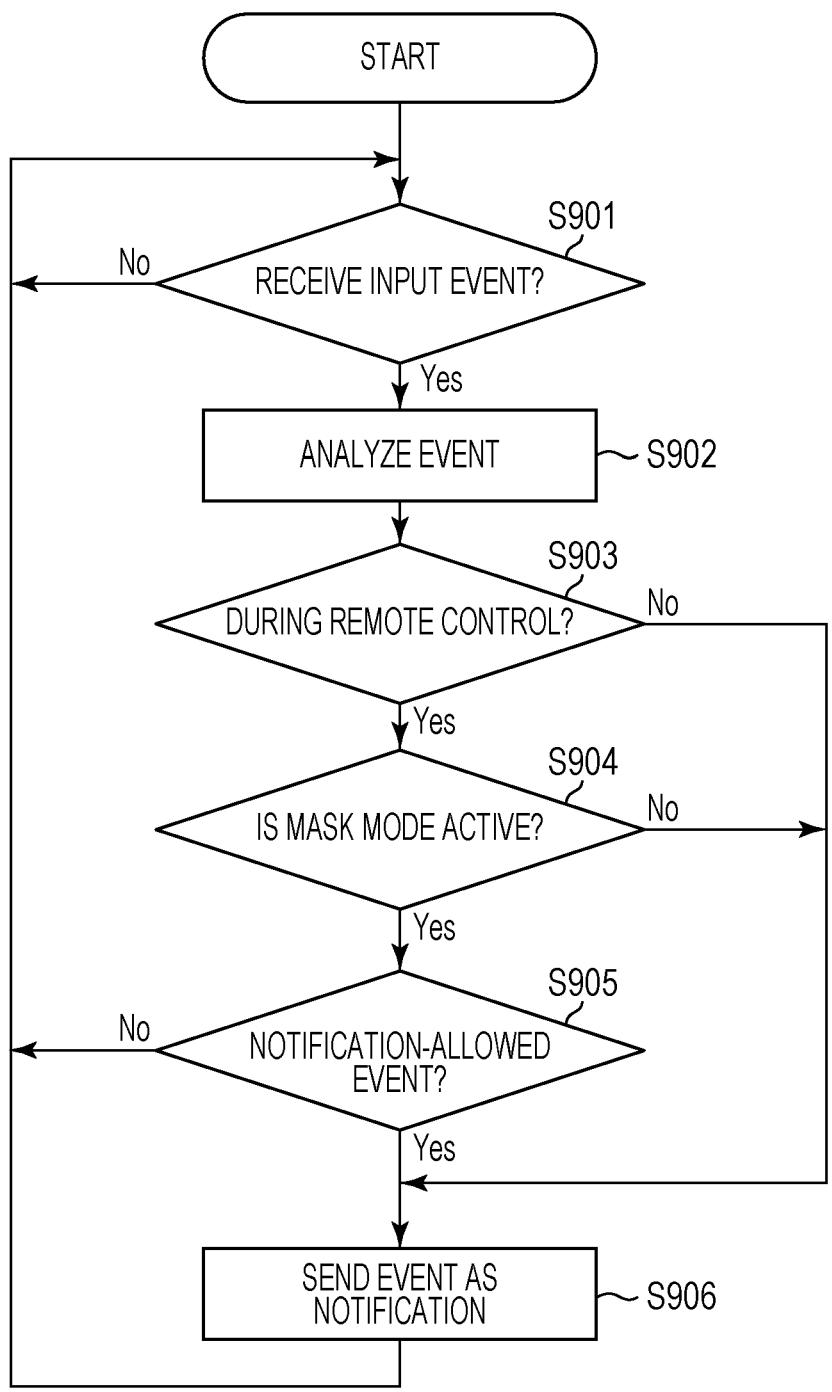
FIG. 9 is a flowchart illustrating details of a process performed by an operation-input analyzing unit.

Next, details of a process performed by the operation-input analyzing unit 311 will be described with reference to the flowchart in FIG. 9. The process described below is realized by a program stored on the HDD 204 being read to the RAM 202 and executed by the CPU 201.

In step S901, the operation-input analyzing unit 311 waits for an input event to be received. Upon receiving the input event, the process proceeds to step S902. The input event received by the operation-input analyzing unit 311 is sent as a notification to the CPU 201 via the operation input I/F 210 in response to an operation on the touch panel 211 or the hard keys 215. In step S902, the operation-input analyzing unit 311 analyzes the received event, and the process proceeds to step S903. Specifically, if the event has been sent from the touch panel 211, information such as coordinates that have been touched or released is analyzed; if the event has been sent from the hard keys 215, information such as the type of the hard key that has been pushed is analyzed.

In step S903, the operation-input analyzing unit 311 determines whether or not remote control is currently being performed. Specifically, as in step S603, the operation-input analyzing unit 311 determines whether or not remote control is currently being performed by referring to the remote-control connection information stored in the RAM 202; however, the determination may be performed in a different manner. If it is determined that remote control is currently being performed, the process proceeds to step S904; if it is determined that remote control is not currently being performed, the process proceeds to step S906.

In step S904, the operation-input analyzing unit 311 determines whether the mask mode is active or inactive. Specifically, the operation-input analyzing unit 311 determines whether the mask mode is active or inactive by referring to the mask-mode setting information stored on the HDD 204. If it is determined that the mask mode is active, the process proceeds to step S905; if it is determined that the mask mode is inactive, the process proceeds to step S906.

In step S905, the operation-input analyzing unit 311 determines whether or not the received event is a notification-allowed event. Specifically, the determination is performed by referring to a notification-allowed event table stored on the HDD 204.

FIG. 10 schematically illustrates the notification-allowed event table. A column 1001 indicates the type of event, and a column 1002 indicates whether or not a notification is allowed while the mask screen is being displayed for each event. In the example in FIG. 10, for events related to the touch panel, the start key, and the stop key, notification is not allowed while the mask screen is being displayed; for an event related to a screen-brightness adjusting key, the notification is allowed even while the mask screen is being displayed. The screen-brightness adjusting key is a hard key for changing the brightness of the display 213. Even if the screen-brightness adjusting key is pressed while the mask screen is being displayed on the display 213 during remote control, since remote control is not affected, notification is allowed. On the other hand, the start key and the stop key are hard keys for starting and stopping various jobs of the image forming apparatus 101. If such a key is pressed during remote control, since it is highly likely that the operator performing remote control may cause unintended processing, notification is not allowed. Note that the content of the notification-allowed event table may be set in advance or may be changed by the user or the operator.

In step S905, if it is determined that the event is a notification-allowed event, the process proceeds to step S906; if it is determined that the event is not a notification-allowed event, the process returns to step S901. In step S906, the operation-input analyzing unit 311 notifies the event processing unit 313 of the notification-allowed event, and the process returns to step S901.

As described above, according to this embodiment, if the mask mode of the image forming apparatus 101 is set to be active, the screen in the normal display region 702 is displayed on the call-center terminal 102, and the screen in the enlarged display region 703 is displayed on the display 213 of the image forming apparatus 101. Therefore, a screen that is operated by the operator on the call-center terminal 102 is not displayed on the operation panel of the image forming apparatus 101. Accordingly, it is possible to perform a maintenance process on the call-center terminal 102 by operating a screen that is not desirably displayed to an end user, such as a maintenance screen. In addition, while the mask screen is being displayed, a predetermined operation through the operation unit is invalidated. Accordingly, it is possible to prevent an unintended operation from being performed by the user of the image forming apparatus 101 during the maintenance process.

If the mask mode is switched to be inactive, even during remote control, the screen in the normal display region 702 is displayed on the operation panel of the image forming apparatus 101, and a screen that is the same or substantially the same as the screen displayed on the call-center terminal 102 is displayed on the operation panel. Accordingly, it is possible for the operator at the call center to support a user who operates the operation panel of the image forming apparatus 101.

Second Embodiment

In the above-described first embodiment, if the mask mode is set to be active, the screen in the enlarged display region 703 is displayed on the operation panel of the image forming apparatus 101 while the image forming apparatus 101 is connected with the VNC client for remote control. On the other hand, upon terminating the connection with the VNC client, the image in the normal display region 702 is displayed on the operation panel (NO in step S603 in FIG. 6 followed by step S606). Accordingly, if the connection with the VNC client is terminated during remote control due to, for example, degradation of a network environment, the image in the normal display region 702 is displayed on the operation panel at the timing the operator of the call-center terminal 102 does not intend. As a result, while the maintenance screen that is visible only to the technician is being displayed on the call-center terminal 102, the connection with the VNC client might be terminated, and the maintenance screen might be displayed on the operation panel of the image forming apparatus 101.

A second embodiment will describe a method for reducing the above-described possibility. The second embodiment will be described below, and most of the description refers to the difference from the first embodiment. In the second embodiment, the process performed by the UI processing unit 302 illustrated in FIG. 6 is different from that in the first embodiment.

Figure 11:
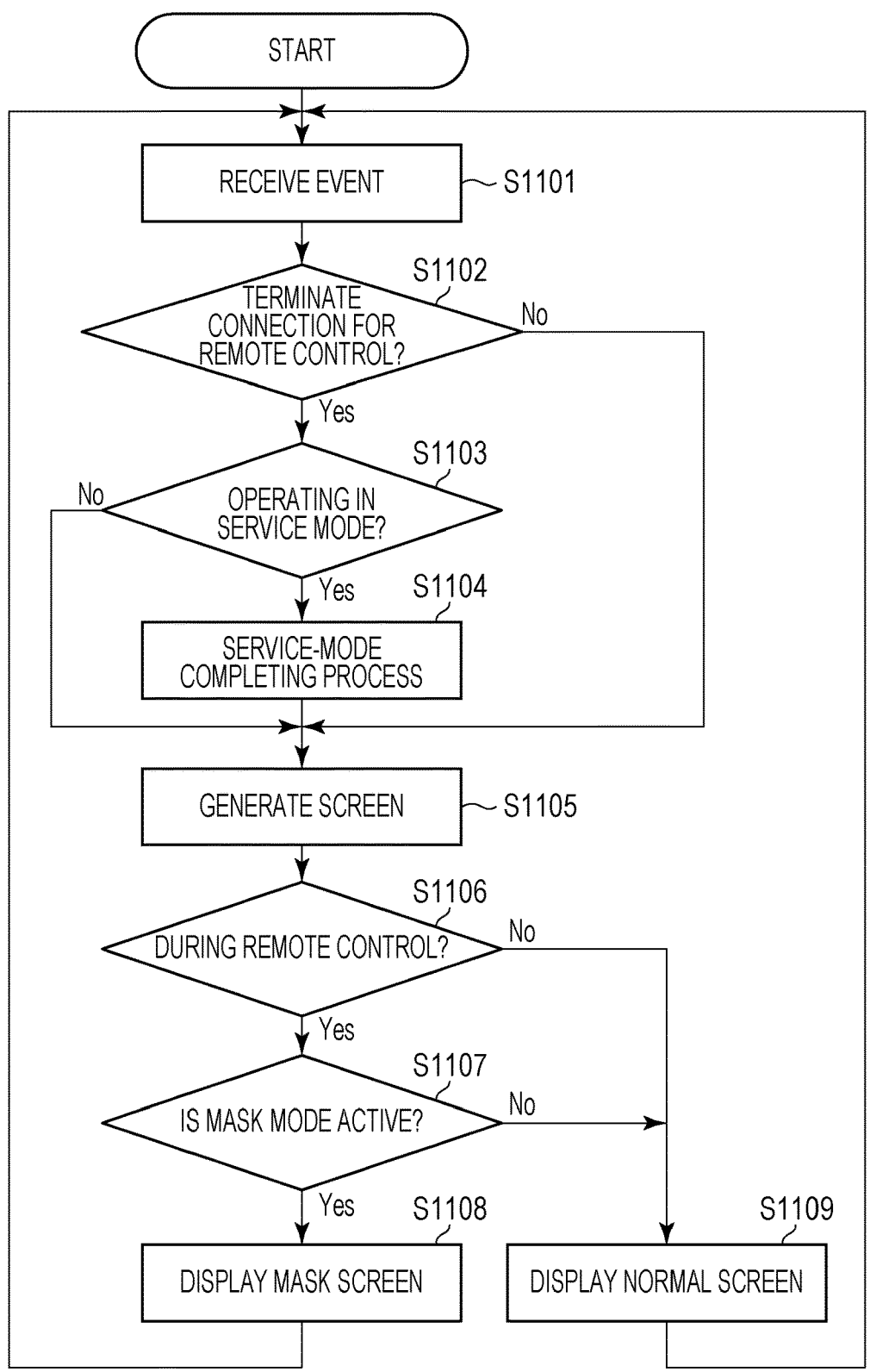
FIG. 11 is a flowchart illustrating details of a process performed by a UI processing unit in an image forming apparatus according to a second embodiment.

FIG. 11 is a flowchart illustrating details of the process performed by the UI processing unit 302 in the second embodiment. The process described below is realized by a program stored on the HDD 204 being read to the RAM 202 and executed by the CPU 201.

Step S1101 is processing for receiving an event as in step S601. In step S1102, the event processing unit 313 determines whether or not the received event is an event sent as a notification indicating the terminating of the connection for remote control. The event indicating the terminating of the connection for remote control is sent as a notification from the connection processing unit 320 in step S510 in FIG. 5. If the received event is an event indicating the terminating of the connection for remote control, the process proceeds to step S1103; if not, the process proceeds to step S1105.

In step S1103, the UI processing unit 302 determines whether or not the image forming apparatus 101 is operating in a service mode. The service mode is a specific operation mode for a technician to perform maintenance and is an operation mode in which various settings that include the initial setting of the image forming apparatus 101 can be made through a service-mode dedicated maintenance screen. By the technician performing a specific operation on the image forming apparatus 101, or by the operator performing a specific operation on the call-center terminal 102, the image forming apparatus 101 transitions to the service mode. The screen generating unit 314 turns on a service-mode flag stored in the RAM 202 at the time of transition to the service mode and turns off the flag at the time of completion of the service mode. The determination in step S1103 is performed by referring to the service-mode flag. If it is determined that the image forming apparatus 101 is operating in the service mode, the process proceeds to step S1104; if it is determined that the image forming apparatus 101 is not operating in the service mode, the process proceeds to step S1105.

In step S1104, the UI processing unit 302 performs processing for completing the service mode. Specifically, the UI processing unit 302 closes the service-mode dedicated maintenance screen and transitions to a normal screen that is allowed to be displayed to an end user. The processing from step S1105 to step S1109 is the same or substantially the same as the processing from step S602 to step S606.

As described above, in the image forming apparatus 101 according to the second embodiment, if the connection for remote control is terminated in the service mode, the service mode is automatically completed. Accordingly, it is possible to reduce the possibility that a restricted screen that is allowed to be visible only to a specific user, such as the maintenance screen, is unintentionally displayed to an end user.

Note that an example of determining in step S1103 whether or not the image forming apparatus 101 is operating in the service mode has been described; however, this processing can be applied to another operation mode in which a restricted screen that is not desirably displayed to an end user is displayable.

Other Embodiments

Note that the above embodiments have described that the remote-control processing unit 307 performs communication with the VNC client operating on the call-center terminal 102 via the remote-maintenance processing unit 306; however, the remote-control processing unit 307 may perform communication directly with the VNC client not via the remote-maintenance processing unit 306.

Note also that the above embodiments have described a case where remote maintenance is performed on the image forming apparatus having the scanning function and the printing function; however, the present invention is applicable an image processing apparatus having either of the functions. In addition, the present invention may be applied to other information processing apparatuses such as a facsimile, camera, video camera, and another image viewer.

As described above, according to the above embodiments, in the information processing apparatus that transmits screen information of an operation screen to an external apparatus in order to enable remote control from the external apparatus, the operation screen is not displayed while the information processing apparatus is connected with the external apparatus for remote control.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-044983 filed Mar. 8, 2016, which is hereby incorporated by reference herein in its entirety.

What is claimed is:

1. An information processing apparatus including a display, the information processing apparatus comprising:
   a display;
   a brightness adjusting key for adjusting a brightness of the display;
   a predetermined key different from the brightness adjusting key;
   a memory;
   at least one processor coupled to the memory which executes the following:
   transmitting, to an external apparatus connected with the information processing apparatus via a network, screen information corresponding to an operation screen for operating the information processing apparatus;
   receiving, from the external apparatus on which a screen based on the screen information is displayed, an instruction based on an operation on the screen;
   accepting a setting that the operation screen corresponding to the screen information transmitted to the external apparatus is not displayed on the display of the information processing apparatus while the information processing apparatus is connected with the external apparatus for remote control;
   performing a control for disabling a touch operation on the display and an operation for the predetermined key and for enabling an operation for the brightness adjusting key in a case where the setting is accepted;
   determining whether or not the information processing apparatus is operating in a specific operation mode in which a restricted screen is displayable, the restricted screen being a screen that is not to be displayed to an end user of the information processing apparatus; and
   completing, if it is determined that the information processing apparatus is operating in the specific operation mode when an event indicating that the connection for the remote control between the information processing apparatus and the external apparatus is to be terminated occurs, the specific operation mode in response to terminating the connection for the remote control so that the restricted screen is not displayed on the display of the information processing apparatus.

2. The information processing apparatus according to claim 1, further comprising:
   causing a screen to be displayed on the display of the information processing apparatus, the screen being a screen different from the restricted screen as the operation screen corresponding to the screen information transmitted to the external apparatus, on the basis of the setting made, while the information processing apparatus is connected with the external apparatus for remote control.

3. The information processing apparatus according to claim 2, further comprising:
   generating screen information of the screen to be displayed on the display,
   causing the screen to be displayed on the display on the basis of the generated screen information.

4. The information processing apparatus according to claim 3,
   wherein the screen information is generated in a virtual display region including a first region and a second region,
   wherein the screen information transmitted to the external apparatus is the screen information generated in the first region, and
   wherein the display of the information processing apparatus is not displayed using the screen information generated in the first region but display using the screen information generated in the second region on the basis of the setting made.

5. The information processing apparatus according to claim 4, wherein the screen information generated in the second region is screen information of a screen for informing a user that remote control is being performed.

6. The information processing apparatus according to claim 1, wherein the operation for the predetermined key includes an operation for issuing an instruction for starting or ending execution of a job.

7. The information processing apparatus according to claim 1, further comprising:
   a scanner reading an image on a document for generating image data.

8. The information processing apparatus according to claim 1, further comprising:
   a printing unit that prints an image on the basis of image data,
   wherein the information processing apparatus is a print control apparatus to control the printing unit, and
   wherein a display item to instruct to start printing is not displayed in a case where the setting is accepted by the print control apparatus.

9. A method for controlling an information processing apparatus including a display, the method comprising:
   transmitting, to an external apparatus connected with the information processing apparatus via a network, screen information corresponding to an operation screen for operating the information processing apparatus;
   receiving, from the external apparatus on which a screen based on the screen information is displayed, an instruction based on an operation on the screen;
   accepting a setting that the operation screen corresponding to the screen information transmitted to the external apparatus is not displayed on the display of the information processing apparatus while the information processing apparatus is connected with the external apparatus for remote control;
   performing a control for disabling a touch operation on a display and an operation for a predetermined key and for enabling an operation for a brightness adjusting key for adjusting a brightness of the display in a case where the setting is accepted, wherein the predetermined key is different from the brightness adjusting key;
   determining whether or not the information processing apparatus is operating in a specific operation mode in which a restricted screen is displayable, the restricted screen being a screen that is not to be displayed to an end user of the information processing apparatus, and
   completing, if it is determined that the information processing apparatus is operating in the specific operation mode when an event indicating that the connection for the remote control between the information processing apparatus and the external apparatus is to be terminated occurs, the specific operation mode in response to terminating the connection for the remote control so that the restricted screen is not displayed on the display of the information processing apparatus.

10. A non-transitory recording medium having a computer program stored therein in a readable manner, the computer program causing a computer to execute a method for controlling an information processing apparatus including a display, the method comprising:

transmitting, to an external apparatus connected with the information processing apparatus via a network, screen information corresponding to an operation screen for operating the information processing apparatus;

receiving, from the external apparatus on which a screen based on the screen information is displayed, an instruction based on an operation on the screen;

accepting a setting that the operation screen corresponding to the screen information transmitted to the external apparatus is not displayed on the display of the information processing apparatus while the information processing apparatus is connected with the external apparatus for remote control;

performing a control for disabling a touch operation on a display and an operation for a predetermined key and for enabling an operation for a brightness adjusting key for adjusting a brightness of the display in a case where the setting is accepted, wherein the predetermined key is different from the brightness adjusting key;

determining whether or not the information processing apparatus is operating in a specific operation mode in which a restricted screen is displayable, the restricted screen being a screen that is not to be displayed to an end user of the information processing apparatus, and completing, if it is determined that the information processing apparatus is operating in the specific operation mode when an event indicating that the connection for the remote control between the information processing apparatus and the external apparatus is to be terminated occurs, the specific operation mode in response to terminating the connection for the remote control so that the restricted screen is not displayed on the display of the information processing apparatus.

* * * * *